United States Patent Office 2,863,849
Patented Dec. 9, 1958

2,863,849

BUTADIENE-STYRENE COPOLYMER-MODIFIED POLYSTYRENE MOLDING COMPOSITIONS

James W. L. Fordham, Painesville, Ohio, assignor to Monsanto Chemical Company, St. Louis, Mo., a corporation of Delaware No Drawing. Application May 5, 1958
Serial No. 732,821

7 Claims. (Cl. 260—45.5)

This invention relates to polystyrene molding compositions. More particularly, this invention relates to heat-resistant polystyrene molding compositions having improved toughness.

It has been the general practice to improve the physical properties of polystyrene by blending therewith a rubbery copolymer of styrene and butadiene. The rubbery copolymers conventionally used for this purpose have been the chemically homogeneous rubbers which are in widespread use at the present time. When such conventional copolymers are blended with polystyrene, there is obtained a composition which has a comparatively high impact strength. However, such blends do not have the requisite toughness for many applications in that they have a generally low ultimate elongation and, as a result, are subject to breakage when deformed to any appreciable extent.

There is no single test known at the present time which can be used to obtain a satisfactory measure of the relative toughness of thermoplastic materials such as polystyrene. A reasonably satisfactory measure of toughness can be obtained by testing such materials for both impact strength and ultimate elongation. A polystyrene composition can be considered to be "tough" only if it has a relatively high impact strength coupled with a relatively large ultimate elongation.

It is an object of the present invention to provide modified polystyrene molding compositions having improved toughness properties.

Another object is the provision of polystyrene molding compositions having improved physical properties due to the incorporation therein of butadiene-styrene copolymers which improve the toughness of polystyrene.

These and other objects are attained by blending 100 parts by weight of polystyrene with about 1–50 parts by weight of a copolymer of about 30–90 weight percent butadiene and, correspondingly, about 70–10 weight percent styrene, said copolymer being prepared by a particular method of polymerization subsequently described.

The following examples are given in illustration and are not intended as limitations on the scope of this invention. Where parts are mentioned they are parts by weight.

EXAMPLE I

Prepare two modified polystyrene molding compositions (Compositions A and B) by the following procedure, using for this purpose the same granular polystyrene, the same polystyrene latex and different butadiene-styrene copolymer latices to be described subsequently.

In preparing each composition, blend about 75 parts of a 40% solids polystyrene latex with about 25 parts of one of the 40% solids butadiene-styrene copolymer latices to be described. Remove the water from the thus-prepared mixture of latices by drum-drying in order to obtain a powdery mixture of polystyrene and the butadiene-styrene copolymer. Thoroughly blend about 40 parts of the drum-dried powder with about 60 parts of granular polystyrene in order to obtain a molding composition containing 90 parts of polystyrene and 10 parts of butadiene-styrene copolymer.

The butadiene-styrene copolymer latex to be used in preparing Composition A comprises a 40% solids latex of a copolymer of 50 parts of butadiene and 50 parts of styrene. This copolymer is prepared employing the following polymerization recipe:

| Component: | Parts by weight |
|---|---|
| Butadiene | 50 |
| Styrene | 50 |
| Water | 150 |
| Potassium stearate | 4.5 |
| t-Dodecyl mercaptan | 0.4 |
| Potassium persulfate | 0.3 |

All of the components of the polymerization recipe except the styrene are charged to a stirred autoclave and polymerization of the butadiene is initiated by heating the reaction mixture to 50° C. After the polymerization is initiated, 35 parts of styrene are added to the polymerization system in 5 equal increments of 7 parts each, an increment of styrene being added when about 10%, 15%, 25%, 35% and 50% of the butadiene has polymerized. The remaining 15 parts of styrene are added to the reaction mixture when 60% of the butadiene has polymerized.

The butadiene-styrene copolymer latex used in preparing Composition B comprises a 40% latex containing a copolymer of 50 parts of butadiene and 50 parts of styrene. This copolymer is prepared employing the identical polymerization recipe set forth earlier herein except that all of the styrene is initially charged to the polymerization system with the butadiene.

The polystyrene latex which is mixed with the copolymer latices in the example comprises a homopolymer of styrene having an average molecular weight of about 70,000 as calculated by the Staudinger equation The granular polystyrene blended with the powder formed by drum-drying the mixed latices likewise has an average Staudinger molecular weight of about 70,000.

Compositions A and B are tested for heat distortion, impact strength, elongation at yield and ultimate elongation by ASTM Tests D648–45T, D256–47T and D628–52T, respectively. The results are summarized in the following table.

*Table I*

AVERAGE PHYSICAL PROPERTIES OF COMPOSITIONS A AND B

| Composition | Heat Distortion Temperature, °C. | Impact Strength (ft. lbs./in. of notch) | Elongation at Yield, percent | Ultimate Elongation, percent |
|---|---|---|---|---|
| "A" | 89.0 | 0.80 | 1.8 | 12.4 |
| "B" | 89.0 | 0.81 | 2.1 | 2.8 |

From the foregoing results, it can be seen that Compositions A and B have equivalent heat distortion temperatures, impact strengths and elongations at yield but that Composition A has about four times as great an ultimate elongation as Composition B. This indicates that Composition A is much tougher than Composition B.

Four compositions identical with Composition A are prepared except that different butadiene-styrene copolymers are employed therein. The resulting compositions have properties substantially analogous to those of Composition A. The butadiene-styrene copolymers included in these compositions are all prepared employing the same basic polymerization recipe previously described. The first copolymer employed is identical with the rubber included in Composition A except that the order in which the styrene and butadiene monomers are charged is exactly reversed. That is to say all of the styrene is initially charged to the polymerization system and the butadiene is added in the same incremental portions previously specified, i. e., 5 increments of 7 parts each are added after about 10%, 15%, 25%, 35% and 50% of the styrene has polymerized and the remaining 15 parts are added when about 60% of the styrene has polymerized. The second copolymer contains 40 parts of butadiene and 60 parts of styrene. All of the butadiene and 10 parts of styrene are initially charged to the polymerization system. Thereafter, 5 incremental additions of 7 parts of styrene are made after about 10%, 15%, 25%, 35% and 50% of the butadiene has polymerized and the remaining 15 parts of styrene are added after about 60% of the butadiene has polymerized. The third copolymer contains 80 parts of butadiene and 20 parts of styrene. All of the butadiene is initially charged to the polymerization and thereafter 3 incremental additions of 4 parts of styrene are made after about 10%, 25% and 35% of the butadiene has polymerized. The remaining 8 parts of styrene are then charged after about 50% of the butadiene has polymerized. The fourth copolymer contains 50 parts of butadiene and 50 parts of styrene. All of the butadiene and 25 parts of styrene are initially charged to the polymerization system and the remaining 25 parts of styrene are charged after about 50% of the butadiene has polymerized.

The butadiene-styrene copolymers employed in the polymer blends of the present invention consist of about 30–90 weight percent butadiene and, correspondingly, about 70–10 weight percent styrene. These copolymers are prepared by a special polymerization procedure in which all of one monomer is initially charged to the polymerization system and the polymerization thereof is initiated. A 10–60% portion of the second monomer is added to the polymerization system either concurrently with the first monomer or at least before more than 10% of the first monomer has polymerized. The polymerization of the first monomer is continued until 40–60% of the first monomer has polymerized. If, during this period, all of the initial charge of the second monomer is consumed, an additional charge thereof is made so that the second monomer will be present in the polymerization system continuously throughout this stage of the polymerization. Thereafter, i. e., after 40–60% of the first monomer has polymerized, the balance of the second monomer, which must constitute at least 40% of the total quantity of the second monomer, is added to the polymerization system. The addition of the second monomer is completed before more than 60% of the first monomer has polymerized and thereafter the polymerization is continued until substantially all of the monomers have polymerized.

Except for the manner and order in which the monomers are charged to the polymerization, the copolymerization of the butadiene and styrene may be carried out in accordance with any of the usual aqueous emulsion polymerization procedures known in the art. In general, the monomers are emulsified in water with the aid of micelle-forming emulsifying agents which are usually compounds containing hydrocarbon groups of from 8 to 22 carbon atoms coupled to highly polar solubilizing groups such as alkali metal and ammonium carboxylate groups, sulfate half ester groups, sulfonate groups, phosphate partial ester groups and the like. Exemplary emulsifying agents include sodium oleate, sodium stearate, the sodium salts of the sulfate half esters of fatty alcohols produced by reduction of the fatty acids of natural oils such as cocoanut oil, sodium abietate, sodium salts of sulfosuccinic esters such as sodium dioctyl sulfosuccinate, sodium salts of alkylated benzene and naphthalene sulfonic acids such as sodium didodecyl naphthalene sulfonate, sodium salts of monosulfated fatty monoglycerides and the like. The polymerization medium will contain a suitable water-soluble free-radical-generating polymerization initiator such as hydrogen peroxide, potassium or sodium persulfates, perborates, peracetates, percarbonates and the like, which polymerization initiators may be associated with activating systems such as redox systems involving versivalent metals and mild reducing agents. Generally the polymerization medium will also contain a chain-transfer agent such as a higher alkyl mercaptan on the order of dodecyl mercaptan, which both moderates the molecular weights of the products and also assists in initiating the action of the polymerization initiator in the polymerization. The polymerizations may be carried out at temperatures from about 40° C. to about 80° C. or, in the case of activated systems, over a range including lower temperatures such as 0° C. to 80° C.

The modified polystyrene molding compositions of the present invention are prepared by blending about 1–50 parts by weight of the butadiene-styrene copolymer with about 100 parts by weight of polystyrene. The polystyrene should have a molecular weight of about 40,000 to 100,000 as determined by the Staudinger equation.

The amount and type of butadiene-styrene copolymer that is blended with the polystyrene will have an important bearing on the physical properties of the resultant composition although an improvement in both impact strength and ultimate elongation will be obtained in all instances when the copolymer and polystyrene are blended in the indicated proportions. If it is desired to obtain a molding composition having a high heat distortion temperature and high surface gloss, the best results are obtained by blending 100 parts of polystyrene with about 1–10 parts of a butadiene-styrene copolymer of about 40–70% butadiene and about 60–30% styrene. Maximum toughness is obtained by blending each 100 parts of polystyrene with about 30–50 parts of a copolymer of 50–90% butadiene and 50–10% styrene. However, compositions which contain 30–50 parts of butadiene-styrene copolymer per 100 parts of polystyrene have neither the surface gloss nor the high heat distortion temperature of compositions containing about 1–10 parts of the copolymer. Molding compositions having intermediate heat distortion, surface gloss and toughness properties are obtained when the amount of butadiene-styrene copolymer blended with the polystyrene is intermediate about 10–30 parts of copolymer per 100 parts of polystyrene.

The butadiene-styrene copolymers of the present invention may be blended with the polystyrene by various methods. Thus, the copolymer may be reduced to dry powdered form and blended with the granular polystyrene in a rotary blender or on a rolling mill. Somewhat better impact strength and ultimate elongation properties are obtained, however, if a portion of the polystyrene, in the form of a latex, is blended with the copolymer in latex form, the mixed latices being dried by any suitable means and then blended with an additional amount of granular polystyrene in order to provide a molding composition having the desired ratio of polystyrene to butadiene-styrene copolymer. In this situation, not more than 50% of the polystyrene which is present in the final molding composition should be derived from the polystyrene latex. Other conventional blending procedures may also be used if desired.

The compositions shown in the example are polymer-copolymer blends which can be used as molding powders to produce articles having improved toughness properties. If desired, the compositions may be modified through the addition of various conventional additives such as dyes, pigments, lubricants, fillers, plasticizers, stabilizers, etc.

This application is a continuation-in-part of my copending application Serial No. 437,877, filed June 18, 1954.

What is claimed is:

1. A molding composition containing as the sole resinous component an intimate binary blend of (a) 100 parts by weight of polystyrene having an average molecular weight of about 40,000–100,000, as determined by the Staudinger equation, and (*b*) 1–50 parts by weight of a copolymer of about 30–90% butadiene with, correspondingly, about 70–10% styrene, such copolymer having been prepared by an aqueous emulsion copolymerization reaction wherein (1) all of one monomer is emulsified in water, (2) polymerization of said first monomer is initiated with a free-radical generating polymerization initiator, (3) 10–60% of the second monomer is added to the polymerization system before more than 10% of the first monomer is polymerized, (4) polymerization of the first monomer is continued in the continuous presence of the second monomer until 40–60% of the first monomer is polymerized, (5) the balance of at least 40% of the second monomer is added to the polymerization system before more than 60% of the first monomer is polymerized and (6) polymerization is continued until substantially all of the monomers are polymerized.

2. A molding composition containing as the sole resinous component an intimate binary blend of (*a*) 100 parts by weight of polystyrene having an average molecular weight of about 40,000–100,000, as determined by the Staudinger equation, and (*b*) 1–50 parts by weight of a copolymer of about 30–90% butadiene with, correspondingly, about 70–10% styrene, such copolymer having been prepared by an aqueous emulsion copolymerization reaction wherein (1) all of the butadiene is emulsified in water, (2) polymerization of the butadiene is initiated by a free-radical generating polymerization initiator, (3) 10–60% of the styrene is added to the polymerization system before more than 10% of the butadiene is polymerized, (4) polymerization of the butadiene is continued in the continuous presence of styrene until 40–60% of the butadiene is polymerized, (5) the balance of at least 40% of the styrene is added to the polymerization system before more than 60% of the butadiene is polymerized and (6) polymerization is continued until substantially all of the monomers are polymerized.

3. A molding composition containing as the sole resinous component an intimate binary blend of (*a*) 100 parts by weight of polystyrene having an average molecular weight of about 40,000–100,000, as determined by the Staudinger equation, and (*b*) 30–50 parts by weight of a copolymer of about 50–90% butadiene with, correspondingly, about 50–10% styrene, such copolymer having been prepared by an aqueous emulsion copolymerization reaction wherein (1) all of one monomer is emulsified in water, (2) polymerization of said first monomer is initiated with a free-radical generating polymerization initiator, (3) 10–60% of the second monomer is added to the polymerization system before more than 10% of the first monomer is polymerized, (4) polymerization of the first monomer is continued in the continuous presence of the second monomer until 40–60% of the first monomer is polymerized, (5) the balance of at least 40% of the second monomer is added to the polymerization system before more than 60% of the first monomer is polymerized and (6) polymerization is continued until substantially all of the monomers are polymerized.

4. A molding composition containing as the sole resinous component an intimate binary blend of (*a*) 100 parts by weight of polystyrene having an average molecular weight of about 40,000–100,000, as determined by the Staudinger equation, and (*b*) 1–10 parts by weight of a copolymer of about 40–70% butadiene with, correspondingly, about 60–30% styrene, such copolymer having been prepared by an aqueous emulsion copolymerization reaction wherein (1) all of one monomer is emulsified in water, (2) polymerization of said first monomer is initiated with a free-radical generating polymerization initiator, (3) 10–60% of the second monomer is added to the polymerization system before more than 10% of the first monomer is polymerized, (4) polymerization of the first monomer is continued in the continuous presence of the second monomer until 40–60% of the first monomer is polymerized, (5) the balance of at least 40% of the second monomer is added to the polymerization system before more than 60% of the first monomer is polymerized and (6) polymerization is continued until substantially all of the monomers are polymerized.

5. A molding composition containing as the sole resinous component an intimate binary blend of (*a*) 100 parts by weight of polystyrene having an average molecular weight of about 40,000–100,000, as determined by the Staudinger equation, and (*b*) 1–10 parts by weight of a copolymer of about 40–70% butadiene with, correspondingly, about 60–30% styrene, such copolymer having been prepared by an aqueous emulsion copolymerization reaction wherein (1) all of the butadiene is emulsified in water, (2) polymerization of the butadiene is initiated by a free-radical generating polymerization initiator, (3) 10–60% of the styrene is added to the polymerization system before more than 10% of the butadiene is polymerized, (4) polymerization of the butadiene is continued in the continuous presence of styrene until 40–60% of the styrene is polymerized, (5) the balance of at least 40% of the styrene is added to the polymerization system before more than 60% of the butadiene is polymerized and (6) polymerization is continued until substantially all of the monomers are polymerized.

6. A molding composition as in claim 5 wherein the butadiene-styrene copolymer contains about 50% butadiene and about 50% styrene.

7. A molding composition as in claim 5 prepared by blending about one-half of the polystyrene in latex form with the butadiene-styrene copolymer in latex form, drying the mixed latices to form a powdery blend and mixing the thus-prepared powdery blend with the remainder of the polystyrene in granular form.

No references cited.